(12) United States Patent
Ricciardi, Sr. et al.

(10) Patent No.: US 8,047,355 B2
(45) Date of Patent: Nov. 1, 2011

(54) AUTOMATIC BELT TRACKING SYSTEM

(75) Inventors: Ronald J. Ricciardi, Sr., Woodcliff Lake, NJ (US); Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 0 days.

(21) Appl. No.: 12/844,455

(22) Filed: Jul. 27, 2010

(65) Prior Publication Data

US 2011/0005904 A1    Jan. 13, 2011

Related U.S. Application Data

(63) Continuation of application No. 11/867,344, filed on Oct. 4, 2007, now abandoned.

(51) Int. Cl.
*B65G 43/00* (2006.01)
*B65G 39/16* (2006.01)

(52) U.S. Cl. .............. 198/806; 198/810.01; 198/810.03; 198/807

(58) Field of Classification Search ............. 198/810.01, 198/810.03, 806, 807
See application file for complete search history.

(56) References Cited

U.S. PATENT DOCUMENTS

| | | | |
|---|---|---|---|
| 1,138,361 A | 5/1915 | Edwards | |
| 3,193,086 A | 7/1965 | Wilhelm | |
| 3,203,537 A | 8/1965 | Holladay et al. | |
| 3,295,736 A | 1/1967 | Leimer et al. | |
| 3,489,264 A | 1/1970 | Begeibing | |
| 3,719,098 A | 3/1973 | Graves | |
| 3,765,037 A | 10/1973 | Dunkin | |
| 3,883,333 A | 5/1975 | Ackley | |
| 3,944,050 A | 3/1976 | Kane | |
| 3,976,382 A | 8/1976 | Westby | |
| 4,286,706 A * | 9/1981 | Castelli et al. | 198/806 |
| 4,343,667 A | 8/1982 | Hollis | |
| 4,344,693 A | 8/1982 | Hamaker | |
| 4,369,878 A * | 1/1983 | Millevoi | 198/807 |
| 4,397,538 A | 8/1983 | Castelli et al. | |
| 4,434,633 A | 3/1984 | Winch et al. | |
| 4,557,372 A | 12/1985 | Rajagopal | |
| 4,585,118 A | 4/1986 | Plaut | |

(Continued)

FOREIGN PATENT DOCUMENTS

DE    1247204 B    8/1967

(Continued)

OTHER PUBLICATIONS

Printouts from Eckels Bilt designs website; http://www.eckelsbilt.com/solutions.php.

(Continued)

*Primary Examiner* — Gene Crawford
*Assistant Examiner* — Yolanda Cumbess
(74) *Attorney, Agent, or Firm* — Fish & Richardson P.C.

(57) ABSTRACT

In an aspect of the present invention, a system and method are provided that detect belt mis-tracking and in response, automatically adjusts. In some implementations, the system and method are implemented in conjunction with a weigh feeder or weigh belt. In other implementations, the system and method are implemented in conjunction with other devices that convey material via one or more belts. The system and method can be implemented by providing one or more sensors that detect belt mis-tracking, a motor for adjusting a belt pulley and one or more controllers that operate the motor in response to signals from the one or more sensors.

15 Claims, 8 Drawing Sheets

U.S. PATENT DOCUMENTS

| | | | | |
|---|---|---|---|---|
| 4,627,702 | A | 12/1986 | Anderson | |
| 4,817,750 | A | 4/1989 | Ishida et al. | |
| 4,959,040 | A | 9/1990 | Gardner | |
| 5,088,363 | A | 2/1992 | Jones et al. | |
| 5,101,980 | A | 4/1992 | Arvidson | |
| 5,117,969 | A | 6/1992 | Roth | |
| 5,237,897 | A | 8/1993 | Wijesinghe et al. | |
| 5,244,435 | A | 9/1993 | Billett | |
| 5,373,935 | A | 12/1994 | Anderson | |
| 5,749,659 | A | 5/1998 | Nisley | |
| 5,911,304 | A | 6/1999 | Cumberlege | |
| 6,058,159 | A | 5/2000 | Conway et al. | |
| 6,126,512 | A | 10/2000 | Chao et al. | |
| 6,173,830 | B1 | 1/2001 | Cumberlege et al. | |
| 6,628,909 | B2 | 9/2003 | Monahan et al. | |
| 6,786,325 | B2 * | 9/2004 | Powell | 198/807 |
| 7,111,724 | B2 | 9/2006 | Donnenhoffer | |
| 2003/0047424 | A1 * | 3/2003 | Monahan et al. | 198/806 |
| 2003/0199349 | A1 | 10/2003 | Sands | |
| 2005/0150747 | A1 | 7/2005 | Menendez | |

FOREIGN PATENT DOCUMENTS

| | | |
|---|---|---|
| EP | AT375327 B | 7/1984 |
| EP | 659448 A5 | 1/1987 |
| EP | 287 874 | 3/1988 |
| EP | 0387242 A1 | 9/1990 |
| EP | 461 860 | 6/1991 |
| EP | 582 019 | 8/1992 |
| EP | 613 730 A2 | 2/1994 |
| EP | 613 730 A3 | 2/1994 |
| EP | 781 248 | 9/1995 |
| FR | 684835 | 11/1929 |
| GB | 810402 A | 3/1959 |
| WO | WO 86/00410 | 1/1986 |
| WO | WO 97/47538 | 12/1997 |

OTHER PUBLICATIONS

"Continuous Web Servo System"; IBM Technical Disclosure Bulletin, IBM Corp., NY, US, vol. 31, No. 10; Mar. 1, 1989; pp. 417-418.

European Search Report EP 08 253228 dated Jan. 21, 2009.

* cited by examiner

AUTOMATIC BELT TRACKING SYSTEM

RELATED APPLICATION

This application is a continuation (and claims the benefit of priority under 35 USC 120) of U.S. application Ser. No. 11/867,344, filed Oct. 4, 2007. The disclosure of the prior application is considered part of (and is incorporated by reference in) the disclosure of this application.

TECHNICAL FIELD

This disclosure relates to an automatic belt tracking system.

BACKGROUND

The precise metering of materials (e.g., dry solids) is important in many applications, including numerous manufacturing processes in various industries. Usually when material is continuously metered into a process, it must be precisely controlled at a specific feed rate so that the process functions as designed, the product formulation is correct, and the quality of the end product of the process does not suffer. In other applications, it is important to just keep track of the amount of material that has passed through a process, and controlling the feed rate is less important, or not important at all. Many of these applications are automated, and productivity concerns demand that they proceed without human intervention to the greatest extent possible.

Various kinds of weigh feeders have been used for weighing and feeding materials such as sand, gravel, grain, foodstuffs, chemicals, pharmaceuticals, ceramics, etc. In general, material is provided to a weigh feeder continuously or periodically and the weigh feeder discharges the material at a desired output rate. Different weigh feeders, however, have different capabilities, which depend on the design of the weigh feeder and its principle of operation. Weight-loss and weigh belt feeders are two types of commonly used weigh feeders.

Weigh belt feeders can weigh material as the material is transported by a moving belt and usually receive a continuous supply of material, generally from an overhead storage supply. In one configuration (e.g., the Acrison, Inc., 260 Belt Weigher/Feeder), material travels from a storage supply, down a chute and onto a rear portion of the belt, which is not weighed. As the belt moves, the material on the belt passes over a weighing section, and a weight signal is produced that corresponds to the weight of material traveling across the weighing section. The weight signal is processed in conjunction with another signal, representing the speed of the belt, by the weigh feeder's controller to derive a feed rate signal. The feed rate signal is compared to the feed rate selected by the user, and the weigh feeder's controller continuously adjusts a variable speed drive powering the belt to maintain the desired feed rate.

A weigh belt feeder may also utilize a feeding mechanism to actively feed material onto the belt (e.g., a screw conveyor/feeder, another belt, a vibratory tray device, etc.). Although such active feeding (or prefeeding) is different from the method of gravimetric feeding described above, the material on the belt is weighed in a similar manner. Such active feeding of material onto the weigh belt can provide a greater degree of physical control over the material being fed. In this mode of operation, the weigh belt moves at a fixed constant speed, and the feed rate of the feeding mechanism is variable. Thus, the weigh feeder's controller continuously modulates the output of the feeding mechanism that feeds material onto the belt to maintain a selected feed rate of material discharging off the belt. Material is usually provided to the feeding mechanism directly from a storage supply, for example, a hopper or silo.

A different type of weigh belt feeder (e.g., the Acrison, Inc., 203/210 weigh belt feeders) operates by weighing the entire weigh belt assembly, while a pre-feeder (e.g., a screw conveyor and/or feeder, another belt, or a vibratory type device) meters material onto the weigh belt, which operates at a fixed constant speed. The output of the pre-feeder, which is equipped with a variable speed drive, is continuously modulated by the weigh feeder's controller so that the rate at which material passes across the weigh belt accurately matches the selected feed rate. In such a weigh feeder, material is also usually supplied to the pre-feeder directly from a storage supply.

A weight-loss feeder (e.g., the Acrison, Inc. 400 Series weight-loss feeders) comprises a material supply hopper and a feeding mechanism mounted on a scale. As material is fed out of the scale-mounted metering/supply system, a decreasing weight signal is produced, which is processed by the weigh feeder's controller in conjunction with a time signal to calculate a feed rate. The feeding mechanism of a weight-loss weigh feeder is equipped with a variable speed drive so that its feed rate output can be continuously modulated by the weigh feeder's controller in order to maintain the selected feed rate. The supply hopper of a weight-loss weigh feeder can be periodically refilled.

In other processes, it is desirable to know how much material has been fed, and control of the amount is not necessary. These applications can utilize a weigh belt weigher, which only weighs the amount of material being conveyed by the belt over a given amount of time. Like the two types of weigh belt feeders discussed above, weigh belt weighers convey material via a moving belt. Indeed, many devices employed in industry convey material via a moving belt.

SUMMARY

In an aspect of the present invention, a system and method are provided that detect belt mis-tracking and in response, automatically adjusts. In some implementations, the system and method are implemented in conjunction with a weigh feeder or weigh belt. In other implementations, the system and method are implemented in conjunction with other devices that convey material via one or more belts. The system and method can be implemented by, e.g., providing one or more sensors that detect belt mis-tracking, a motor for adjusting a belt pulley and one or more controllers that operate the motor in response to signals from the one or more sensors.

The details of one or more implementations are set forth in the accompanying drawings and the description below. Various features and advantages will be apparent from the description and drawings, and from the claims.

The figures are not drawn to scale.

DETAILED DESCRIPTION

The following is a description of preferred implementations, as well as some alternative implementations, of a system and method for automatic belt mis-tracking adjustment and/or correction.

In many spheres of industry, belt conveyors are widely utilized to transport all sorts of material from one location to another. In the various processing industries, belt conveyors are commonly used to transport, e.g., dry bulk solid ingredients from one point to another. Belt conveyors are also used as the conveying/weighing apparatus for weigh belts (e.g., as a weigh belt feeder or as a weigh belt weigher). In such applications, the weight of the material on the belt is weighed as the belt passes over a weight sensing section.

Belt conveyor mechanisms can be subject to belt mis-tracking difficulties, typically caused by belt expansion or contraction, dirt or dust accumulation/adhesion on the underside of the belt or on the belt pullies (upon which the belt rides), uneven belt loading, as well as other mechanical reasons. When this occurs, and if not addressed in time so that the belt mis-tracking can be corrected (which is commonly a mechanical adjustment, often made to the belt's rear pulley), weighing performance can be adversely affected and/or the belt can be irreparably damaged. Unfortunately, in most continuous processing/manufacturing operations where belt conveyors are utilized, and more specifically, where weigh belt feeders or weighers are concerned, a mis-tracking belt (or one that is damaged as a result of mis-tracking) requires that the process be shut down to either correct the mis-tracking belt, and/or to replace a damaged belt.

Figure 1:
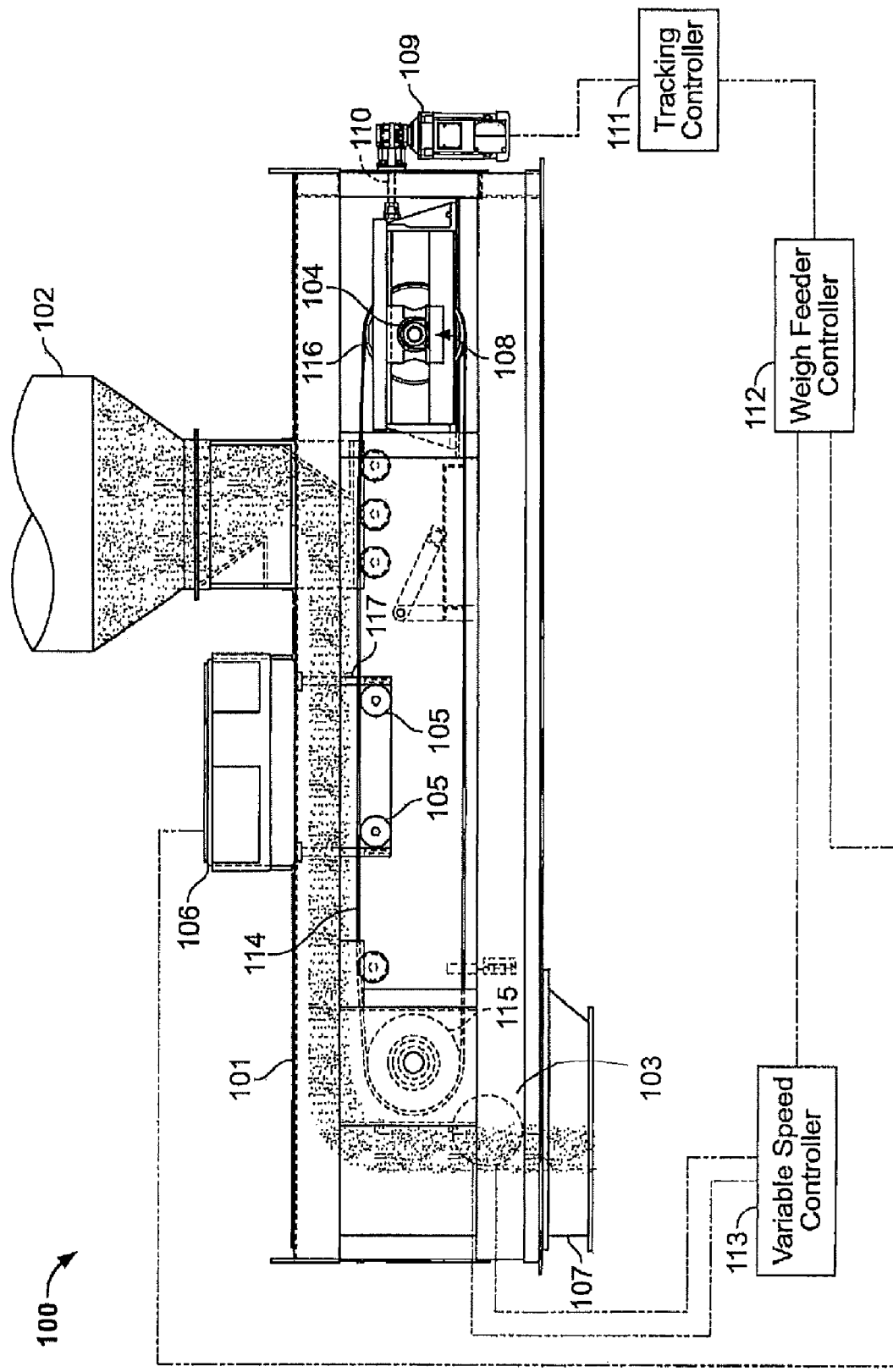
FIG. 1 depicts an overview of an implementation of a weigh belt weigher/feeder system.

FIG. 1 depicts an overview of an implementation of a weigh belt weigher/feeder system 100 incorporating automatic belt mis-tracking adjustment. The weigh belt weigher/feeder system 100 incorporates several major components in this implementation. Chassis 101, among other things, provides structural support for the mechanical aspects of the system 100, and maintains those aspects in substantially operational alignment. Chassis 101 is normally constructed of metal, e.g., steel, but can vary to suit the application. Product storage supply 102 supplies material for weighing/conveyance to the belt 114, and can take the form of, e.g., a hopper or screw conveyor. Material from the product storage supply 102 travels onto belt 114 which is coupled to front pulley 115 and rear pulley 116. The belt 114, as shown in this implementation, is the endless type and has portions which, during a given instant of belt travel, are parallel to each other. The portions that are parallel to each other may be differentiated from each other by referring to the "top half" and "bottom half" of the belt. These portions are substantially linear (as opposed to some portions of the belt 114 which are wrapped around pulleys 115 and 116). The belt 114 has edges which define its width.

In the implementation, pulleys 115 and 116 rotate in a counter-clockwise direction, thereby transporting material from the material storage supply 102 toward output opening 107. In this implementation, only the front pulley 115 is driven (here, by gearmotor drive 103), whereas the rear pulley 116 is not powered. The speed of the belt is detected by a speed sensor 104 coupled to the rear pulley 116. The sensor 104 can take many forms, such as a tachometer based on, e.g., a magnet that induces a changing magnetic field upon a Hall Effect transistor or a stroboscope which alternates light and dark upon a photodiode. Also, the motor controller 113 can be used to detect how fast the gearmotor drive 103 is rotating (e.g., by a tachometer attached to the gearmotor driver 103 or by detecting back EMF).

As material travels from the product storage supply 102 to output opening 107, it passes over the weigh idlers 105 which ride below the top half of the belt 114. The weigh idlers 105 are unpowered (e.g., idle) pulleys that allow the belt 114 to pass freely over them and provide support for the belt 114 and material transported on it. The weigh idlers 105 are coupled to the weigh bridge 117, which is in turn coupled to the weighing system. Thus, the weight of the material on the belt 114, passing over the weigh idlers 105, is detected by the weight sensor 106. The weight sensor 106 is discussed in more detail herein.

In this implementation, one side of the rear pulley 116 is mounted on a take up bearing 108. The other side of the rear pulley (i.e., the far side in this perspective) is fixed in place, but is slidable (e.g., adjustable) to maintain the desired tension on the belt 114 (see FIG. 3B). Other implementations may utilize take up bearings 108 on both sides of the rear pulley 116. To adjust the side of the rear pulley 116 mounted on the take up bearing 108, a driveshaft 110 is coupled to the take up bearing 108. The driveshaft 110 is in turn coupled to a tracking gearmotor 109. The tracking gearmotor 109 causes the driveshaft 110 to rotate, thereby causing the rear pulley 116 mounted on the take up bearing 104 to translate horizontally either toward the front (e.g., toward the output opening 107) or toward the rear of the belt 114 (e.g., toward tracking gearmotor 109). The direction of translation (if any) is based upon what is needed to address mis-tracking (if any) of belt 114.

The operation of the system is managed by one or more controllers. The controllers can be implemented in various ways, including, e.g., a PC programmed with appropriate software, a PLC, and/or a proprietary/customized interface utilizing EEPROMs or other programmable memory. In this illustration, the controllers are shown as three separate entities 111, 112 and 113, but they may be implemented by a single piece of hardware or software, or in as many separate components as is expedient for the particular application.

The weigh feeder controller 112 receives signals from the weight sensor 106 which indicates the weight of the material on the belt 114 passing over weigh idlers 105. In a weigh feeder, this signal is received by the weigh feeder's controller for feed rate calculation purposes. In turn, the weigh feeder's controller outputs a command to the feeder's variable speed controller 113 to control the speed of the gearmotor 103 as required to ensure the selected material flow rate is achieved. Alternatively, the variable speed controller can control, e.g., the motor in a screw conveyor in the product storage supply 102. In other words, the weight signal 106 can be used to control the speed of the belt 114 or the speed at which material is supplied to the belt 114 in relation to a feed rate selection. In some applications, the variable speed controller 113 operates in a closed-loop configuration, e.g., it uses a feedback loop that detects the speed of the gearmotor 103 and/or belt 114 and adjusts accordingly. The feedback loop may utilize a signal from speed sensor 104, and may receive that signal from the weigh feeder controller 112. In still other implementations, the system 100 can be used as a weigh belt weigher where the speed of the gearmotor 103 is maintained constant, with its speed designed to adequately handle the required flow rate. In such an implementation, the variable speed controller 113 is configured to provide a constant speed. This can also be implemented by replacing variable speed controller 113 and gearmotor 103 with a purpose-built constant speed drive. Controller 113 can thus take many forms, including a dedicated controller (e.g., the Acrison, Inc. 060 or 040 motor controllers).

The weigh feeder 100 includes one or more sensors (discussed below) that detect whether the belt 114 is mis-tracking in one direction or another. Signals from these sensors are passed to the weigh feeder controller 112. The speed sensor 104 passes a signal to the weigh feeder controller 112 indicative of the belt speed. The tracking controller 111 receives the signals from the mis-tracking sensors and the speed sensor 104 from the weigh feeder controller 112. Based upon whether the mis-tracking sensors have been triggered, the tracking sensor causes the tracking gearmotor to rotate in a direction that will address the mis-tracking. In some implementations, multiple mis-tracking sensors are used to enable the tracking controller 111 to determine what type of rotation of the tracking gearmotor 109 is needed to address the mis-tracking. In some implementations, the one or more mis-tracking sensors detect the extent or degree of mis-tracking. The tracking controller 111 can also receive a signal indicative of the belt speed. This is done in some implementations so that the speed and/or frequency at which the take up bearing 108 is adjusted varies based on the belt speed. For example, at faster belt speeds, the take up bearing 108 can be adjusted at a slower pace than when the belt 114 is at a low speed.

Figure 2:
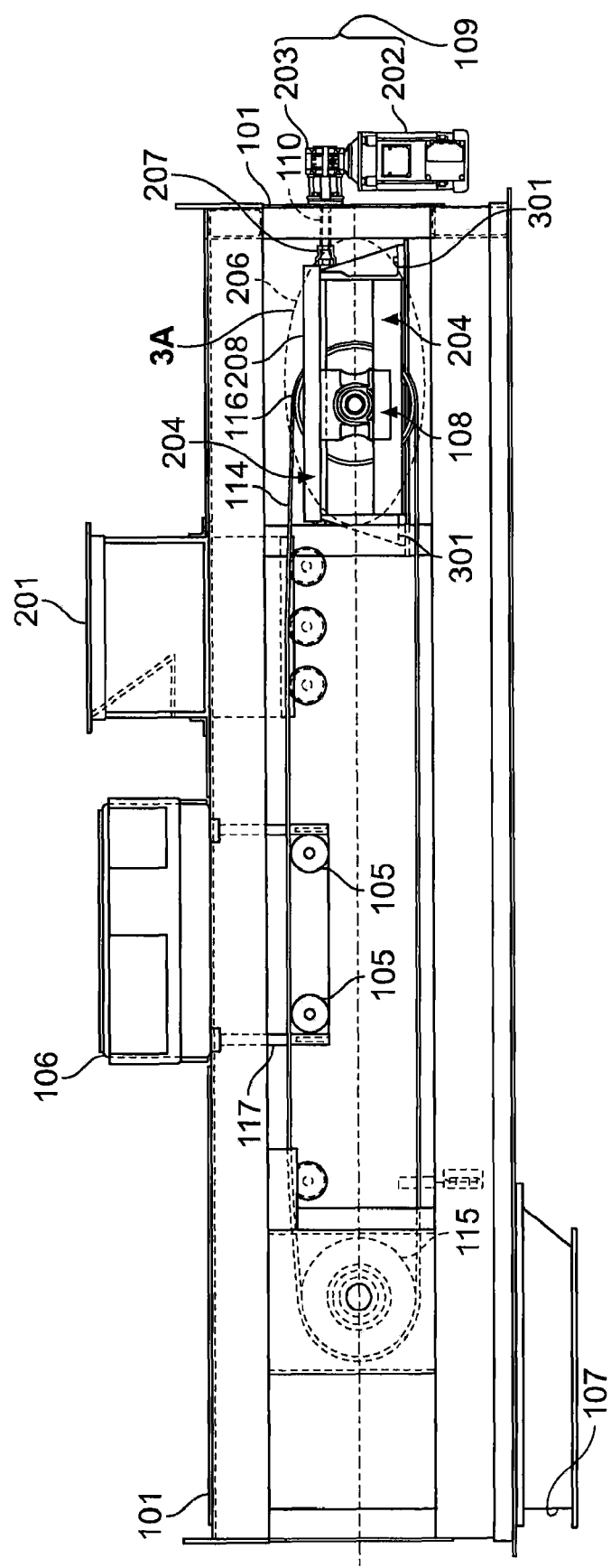
FIG. 2 is a diagram of an implementation of a weigh belt weigher/feeder.

FIG. 2 is a more detailed diagram of an implementation of a weigh belt weigher/feeder. As before, a chassis 101 is provided to maintain the operational relationships of the mechanical elements. The desired supply hopper or conveyor is coupled to the input 201, which directs material onto the belt 114. The belt 114 is mounted between the front pulley 115 and rear pulley 116. The rear pulley 116 is mounted on a take up bearing 108. In this implementation, the take up bearing 108 is mounted on take up bearing rails 204. The take up bearing 108 and bearing rails 204 are components of the bearing assembly 208 (but other components may also be included). The take up bearing 108 translates along the rails 204 (e.g., in a direction either away from or toward product output opening 107). The rotation of driveshaft 110 (coupled to the bearing assembly 208 by the drive socket 207) causes the take up bearing 108 to translate one way or another along the rails 204. The driveshaft 110 is coupled to tracking gear assembly 203, which is coupled to tracking motor 202. The tracking gear assembly 203 can include, e.g., a reduction gear to increase torque or can be direct drive. The tracking motor 202 can be AC or DC, induction or synchronous, commutated or brushless, and/or could take the form of a stepper motor. The tracking gear assembly 203 and tracking motor 202 are mounted to the chassis 101 by mounting means 205, which can take the form of welding, bolt(s), screws, or the like.

As the driveshaft 110 rotates (e.g., upon rotation of the tracking motor 202), it causes the take up bearing 108 to translate along the rails 204. This causes the angle defined by the longitudinal axis of the rear pulley 116 to vary. In most implementations, the variance of the angle of the rear pulley does not affect rotational performance because the bearings employed are self-aligning.

Figure 3A:
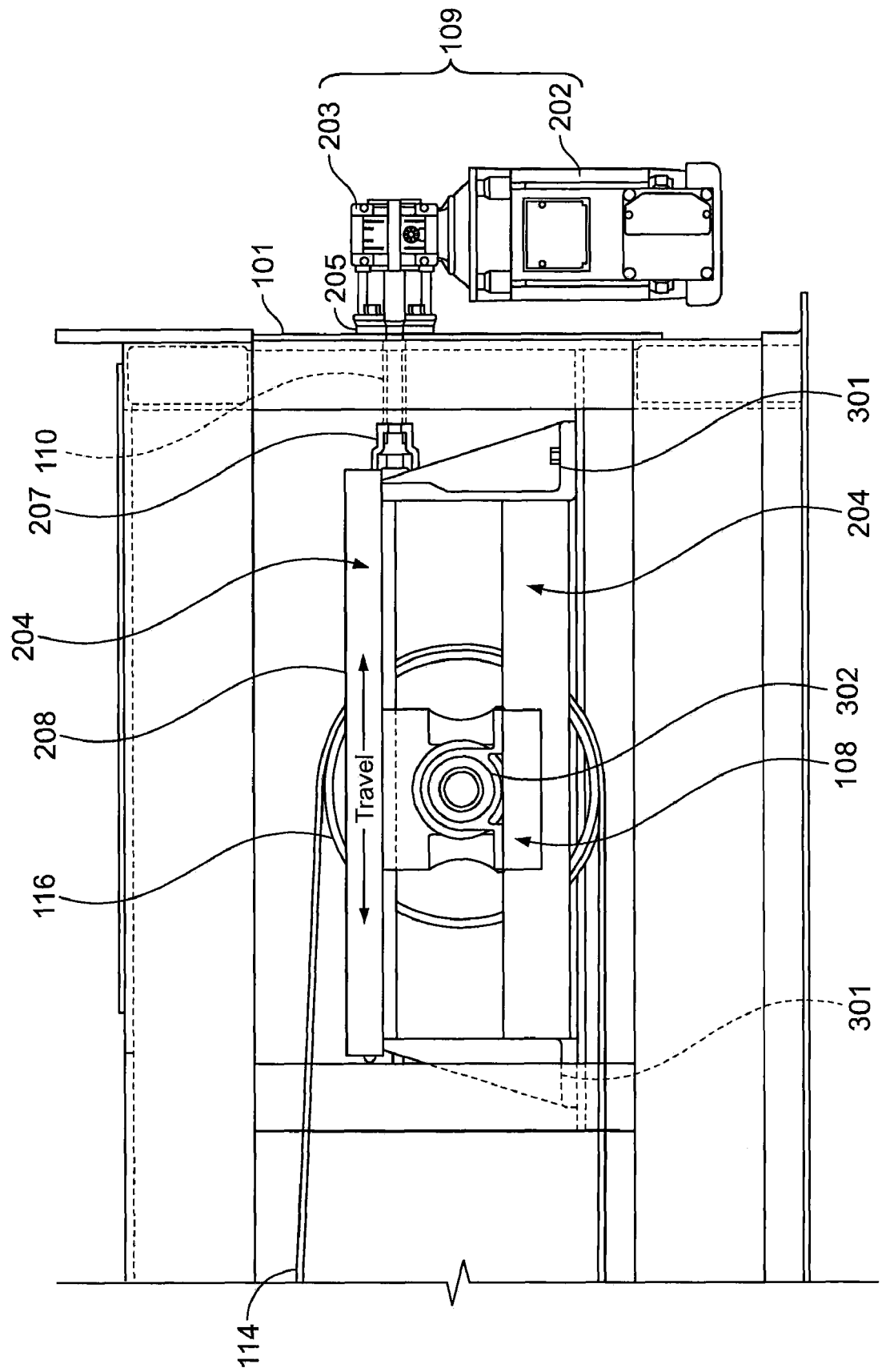
FIG. 3A is a diagram of an implementation of a mis-tracking adjustment mechanism.

FIG. 3A is a diagram of an implementation of a mis-tracking adjustment mechanism, and more particularly, illustrates in detail the area indicated generally by region 206 in FIG. 2. Visible in this view are bearing assembly brackets 301. The brackets 301 attach the bearing assembly 208 to the chassis 101. Secure attachment is beneficial to ensure that the take up bearing 108 can translate smoothly with respect to chassis 101.

The take up bearing 108 and other portions of the take up bearing assembly 208 are usually made from metals such as bronze, iron, or steel. Other materials are useable depending upon the implementation.

The pulley rotates about a bearing 302. Bearing 302 is, in most implementations, a self-aligning bearing. Depending on the application, self-aligning bearings are generally constructed with the inner ring and ball assembly contained within an outer ring that has a spherical raceway. This construction allows the bearing to tolerate angular misalignment resulting from the deflection that may arise as the take up bearing 108 slides along the rails 204.

Figure 3B:
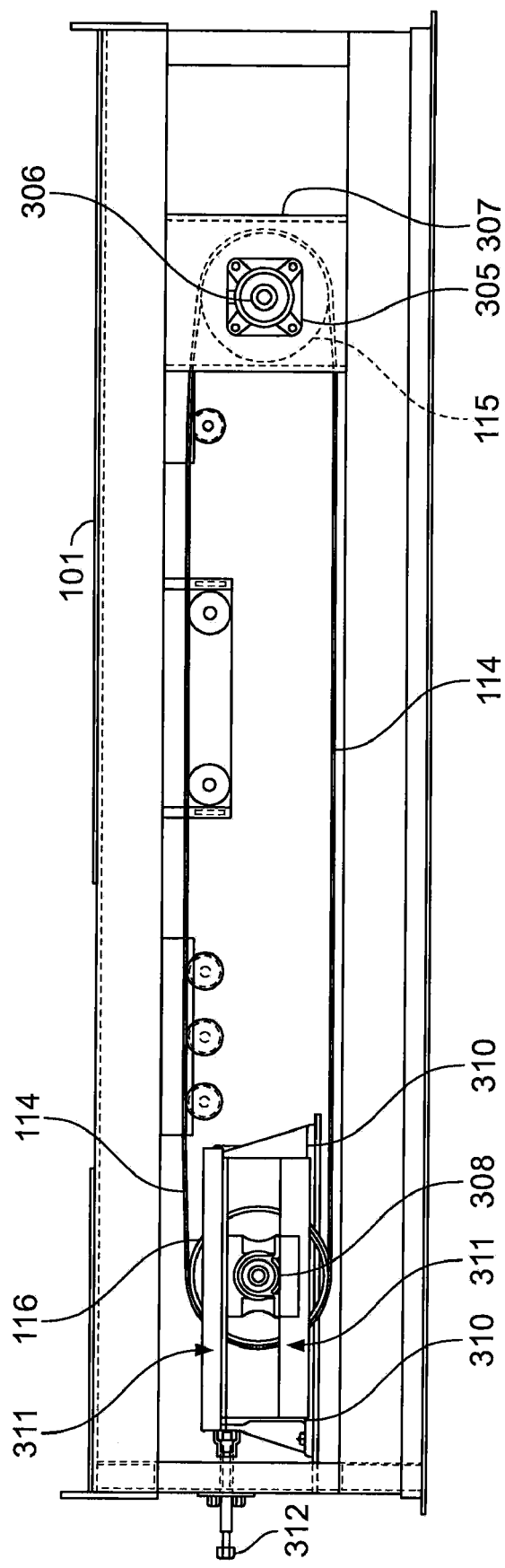
FIG. 3B is an alternate view of a weigh belt weigher/feeder system.

FIG. 3B is an alternate view of a weigh belt weigher/feeder system. This illustration is of the fixed side of a weigh belt weigher/feeder system implementation that adjusts one side of the rear pulley 116. This view is from the perspective of FIG. 2, but with the chassis 101 rotated 180 degrees about the vertical axis. As compared to, e.g., FIG. 2, some features have been omitted for clarity.

Similar to the side of the rear pulley 116 that is adjustable, the rear pulley is mounted on a bearing 308. Like various other bearings throughout the system, bearing 308 is a self-aligning type. The bearing 308 can translate along rails 311 in response to rotation of the adjustment shaft 312. In some implementations, the adjustment shaft 312 is set for optimal belt tension and/or alignment during initial set up, and the bearing 308 remains in a fixed position relative to the rails 311 unless the adjustment shaft 312 is re-adjusted. The rails are mounted to chassis 101 via brackets 310, which maintains the rails 311 and bearing in a secure relationship relative to the chassis 101.

The front pulley 115 is also mounted on a bearing 305. The bearing 305 is self-aligning, and is coupled to a plate 307 that is fixedly attached to the chassis 101. In some implementations, the front pulley 115 is not adjustable. In this implementation, a tachometer 306 is coupled to the bearing 305 to sense the rotational speed of the front pulley 115. In some implementations, a tachometer is placed on the pulley that is not driven since it is not as susceptible to slippage due to the drive torque. This may increase the accuracy of belt speed detection.

Figure 4A:
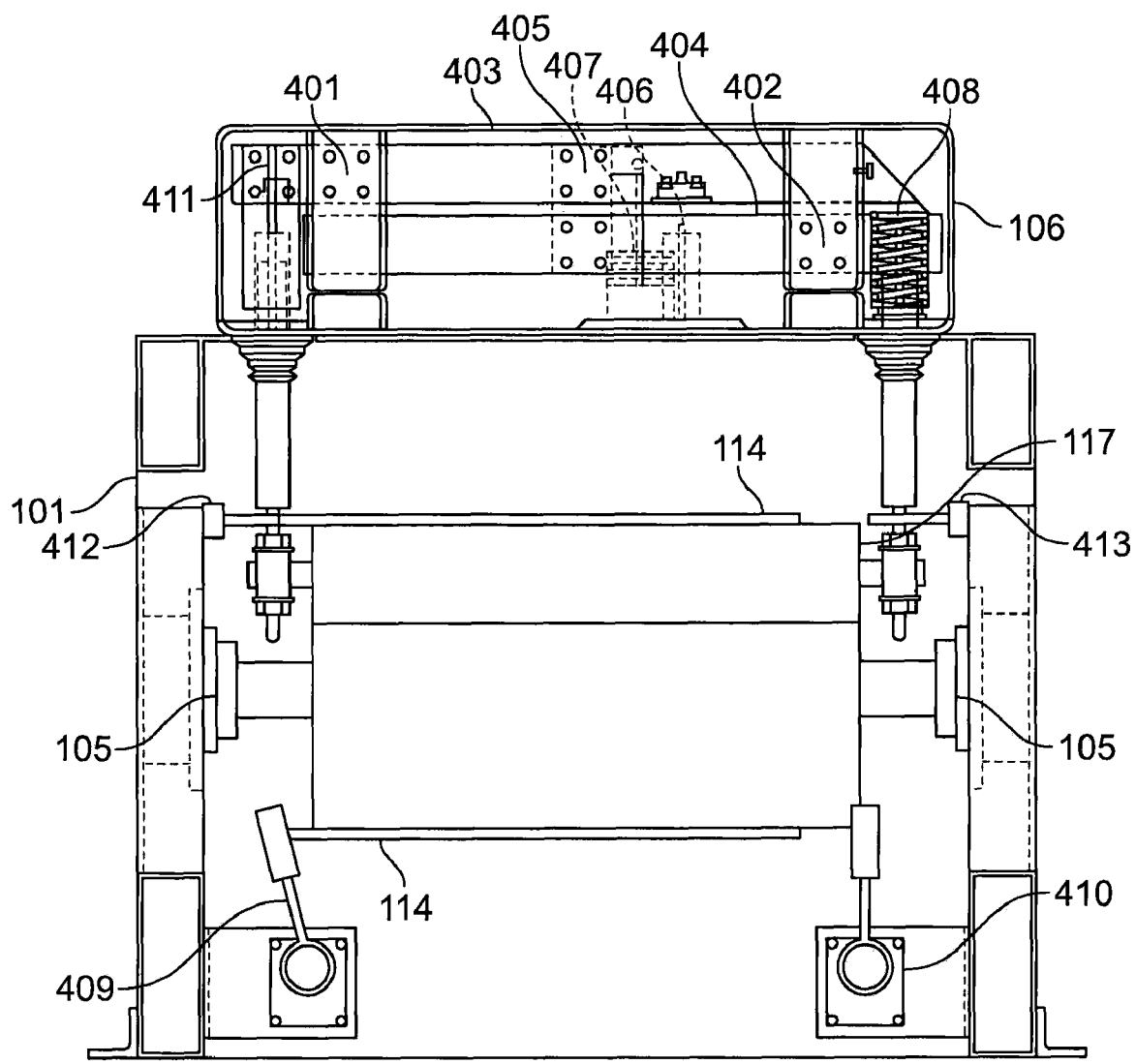
FIG. 4A illustrates a first example of belt mis-tracking, and an implementation of sensors.
Figure 4B:
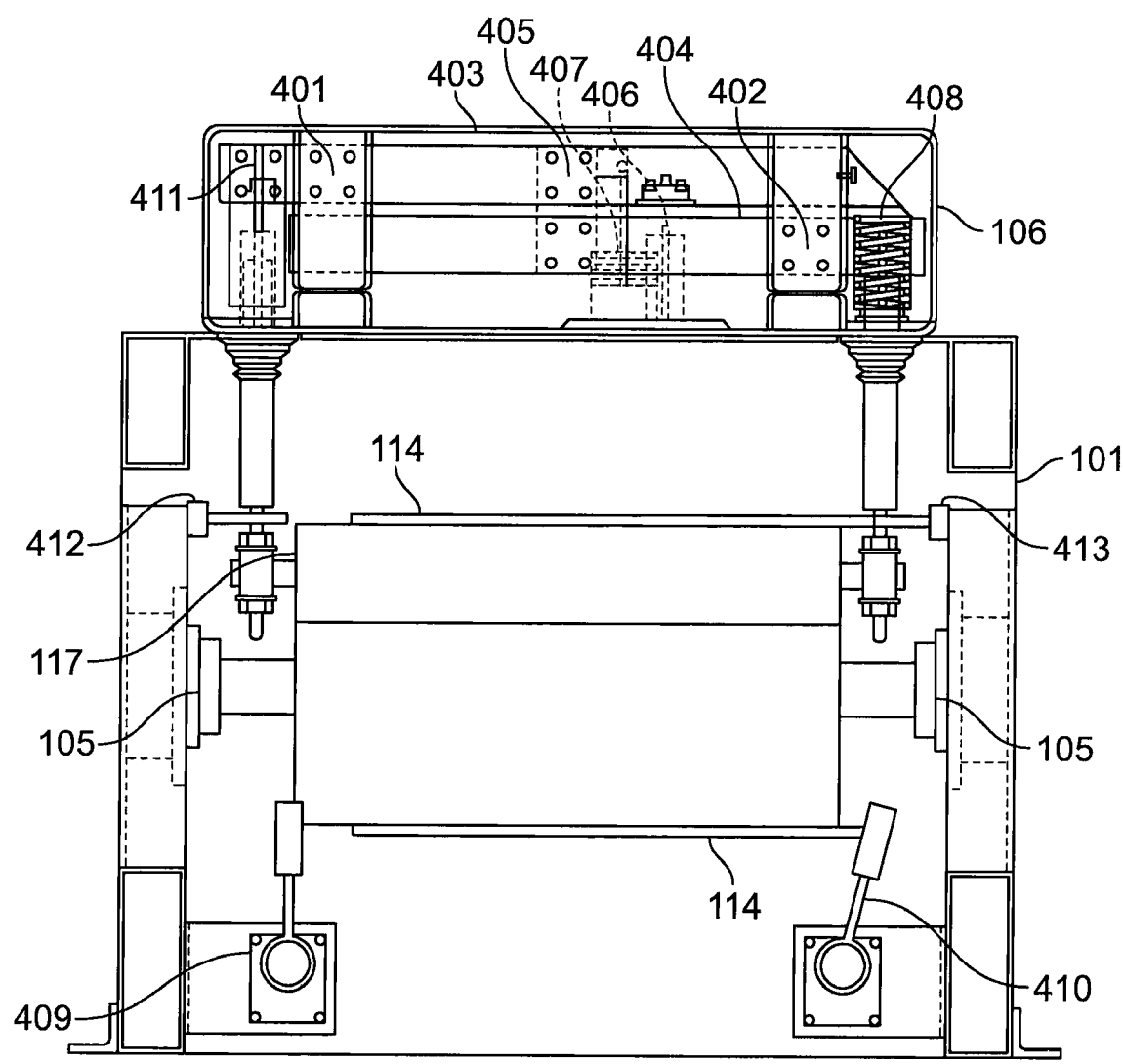
FIG. 4B illustrates a second example of belt mis-tracking, and an implementation of sensors.

FIGS. 4A and 4B depict an implementation of a substantially frictionless, lever type weighing system (which may be an aspect of the weight belt weigher/feeder system 100) that utilizes flexural pivots (flexures) for all pivotal connections associated with the various members of the lever mechanism. Two primary flexures 401 and 402 connect each of the two primary weigh beams 403 and 404 to the main framework of the lever weighing system (e.g., a portion of chassis 101). The two weigh beams 403 and 404 are joined together with a linkage assembly equipped with two flexures 405. Four additional flexures 408 and 411, located at each of the four ends of weigh beams 403 and 404, support and connect weighbridge assembly 117 to the rest of lever weighing system. The design of these flexures provides rigidity in both the horizontal and vertical planes, greatly enhancing the ability of the weighing system to maintain its calibration and accuracy. Weight sensor 106, attached to the lever mechanism, measures vertical movement (or displacement) of the lever mechanism as weight is applied or removed from the weighbridge 117 (e.g., as the belt 114, and material thereon, passes over the weighbridge 117). The lever weighing system includes a dashpot 407 to dampen (e.g., eliminate) any undesirable instability (e.g., bouncing) of the lever mechanism. In this implementation, the majority of the weighing system is mounted above the weigh belt 114, away from the material feed zone.

As the belt 114 passes over the weigh idlers 105 of weighbridge 117, the weight of material on the belt 114 causes the lever weighing system to move in a very precise and linear relation to that weight (the weight of the belt 114 itself is, in some implementations, "tared-off" so that only the weight of the material on the belt is weighed). This movement (or displacement) of the lever weighing system is sensed by the Digital Weight Resolver 406, which is a displacement transducer, and converts (substantially instantaneously) the displacement into a binary coded, serially transmitted data stream indicative of weight, having a discrete resolution of 20 bits (i.e., 1 part in 1,048,576).

FIG. 4A depicts a first case of belt mis-tracking. Here, the belt 114 is tracking too far to the left, and triggering first mis-track sensor 409. In other implementations, mis-track sensors can disposed to sense mis-tracking by detecting the movement of the upper half of the belt rather than the lower half (e.g., sensors 412 and 413). In this case, because the mis-track sensor 409 has been triggered, the control system will adjust the take up bearing such that the belt will move away from mis-track sensor 409 while the device is in use.

Mis-track sensor 409 can take many forms, including, for example, a contact switch (e.g., one that closes or opens one or more circuits upon the belt contacting the switch), a transmitter/receiver (e.g., one in which a signal passes from the transmitter to the receiver, and is triggered when mis-tracking interrupts the signal's passage), or an inductance proximity sensor. Myriad other arrangements are possible, with contact-type switches (e.g., those that require the belt to actually contact the switch) often used in most implementations. Regardless of the particular type of sensor 409, it is beneficial in some implementations that the sensor 409 be capable of detecting more than one stage of mis-tracking. For example, one inch of mis-tracking may trigger detection of stage 1 mis-tracking, two inches of mis-tracking may trigger detection of stage 2 mis-tracking, three inches of mis-tracking may trigger detection of stage 3 mis-tracking, and so on. A multi-stage switch is one manner of implementing such a sensor. A multi-stage switch, as may be implemented in a mis-tracking system, generally comprises a member that is displaced relative to the switch housing when contacted by an edge of the belt. The multi-stage switch is capable of discerning the degree to which the member is displaced relative to the switch housing, and thus can detect the degree to which the belt is mis-tracking. Another manner is using an array of transmitter/receivers. Yet another manner is associating different voltage levels from an inductance proximity sensor with different stages of mis-tracking.

FIG. 4B depicts a second case of belt mis-tracking. Here, the belt 114 is tracking too far to the right, and triggering the second mis-track sensor 410. In other implementations, mis-track sensors can disposed to sense mis-tracking by detecting the movement of the upper half of the belt rather than the lower half (e.g., sensors 412 and 413). In this case, because the mis-track sensor 410 has been triggered, the control system will adjust the take up bearing such that the belt will move away from mis-track sensor 410.

Figure 5:
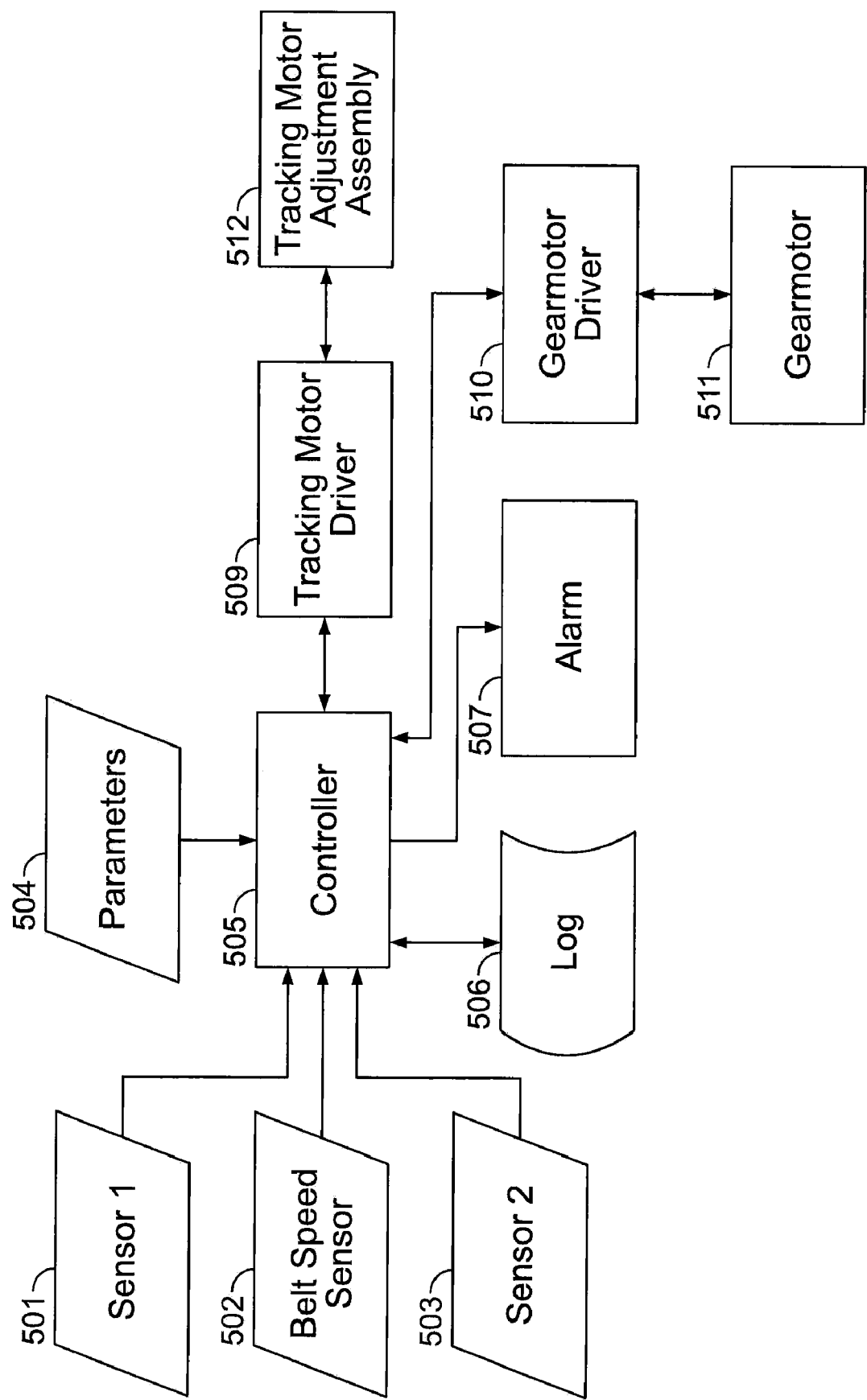
FIG. 5 is a schematic of an implementation of an automatic belt mis-tracking adjustment system.

FIG. 5 is a schematic of an implementation of an automatic belt mis-tracking correction system. The controller 505 is responsible for, among other things, receiving data from various sensors, and based on that data, controlling the behavior of the system. The controller can take many forms, and can be embodied in a general purpose computer programmed with appropriate software, a PLC (e.g., one that is programmable using the IEC 61131-3 standard graphical and/or textual programming language(s)), or various other programmable electronics (e.g., EEPROMs). Controller 505 may include all or some of the elements 111, 112, and 113 of FIG. 1. Sensor 1 (501) and sensor 2 (503) send data to the controller 505 indicative of whether, and to what extent, a belt is mis-tracking in one direction or another. For example, sensor 1 (501) may be triggered when a belt mis-tracks to the left, whereas sensor 2 (503) may be triggered when a belt mis-tracks to the right. Moreover, the sensors 501 and 503 can be capable (in at least some implementations) of detecting more than one degree of mis-tracking. In other words, the sensors 501 and 503 can be capable of determining not only whether the belt is mis-tracking, but also how much it is mis-tracking. Thus, some implementations of the system can correct not just dangerous amounts of mis-tracking, but can also be used to keep the belt (e.g., 114) centered.

Belt speed sensor 502 sends data to the controller 505 indicative of how fast the belt is traveling. Belt speed sensor 502 can take the form of, e.g., a tachometer. Sensors 501, 502 and 503 may be wired directly to the controller 505 or they may use a wireless or otherwise networked connection. In some implementations, the controller 505 is in a location remote from other elements of the system. Given that, it should be understood that the lines indicating communication between various system elements can include wired or wireless connections, networked connections, internet connections and the like.

In some implementations, it is beneficial that the controller 505 monitor data from sensors 501, 502 and 503 (e.g., intermittently or continuously). The manner in which controller 505 controls the system (informed by data from sensors 501, 502 and 503) is dependent on parameters 504. Parameters 504 can be stored in an electronic data store that is coupled to controller 505, and may be the part of the same hardware that makes up controller 505. In cases where the controller 505 is managed remotely [e.g., via an internet, cellular, public switched telephone network ("PSTN"), LAN, WAN or wireless connection], the parameters 504 may be stored remotely or locally. The parameters 504 can include data such as: mis-tracking thresholds for one or more stages of mis-tracking, acceptable belt speed ranges, when to stop the belt due to mis-tracking, when to sound an alarm due to mis-tracking, the extent the speed of belt-tracking adjustments should be dependent upon belt speed, etc.

In some implementations, the controller 505 is coupled to a log 506. The log records events such as when (and to what extent) mis-tracking occurred. This can allow, for example, an operator to correlate certain process events with greater incidence of mis-tracking. This may allow operators to optimize certain process steps to prevent, e.g., mis-tracking that requires operator intervention. Moreover, the log 506 can be used to inform the controller 505 so that during instances when (historically speaking) mis-tracking is likely, the controller can take steps to actively prevent mis-tracking. For example, the controller 505 can take read data from sensors 501, 502 and/or 503 more frequently or cause the tracking motor 512 to adjust mis-tracking more aggressively (e.g., more quickly). The configuration relating to these features can be stored in parameters store 504.

When the controller 505 detects that a mis-tracking condition exists based on signals from sensors 501 and/or 503, it takes steps to address it. Depending on one or more signals from the sensors 501 and/or 503, the controller 505 determines whether the belt is mis-tracking in a first (e.g., left) or second (e.g., right) direction. The controller 505 also determines, based on a signal from belt speed sensor 502, how fast the belt is moving. The controller 505 sends a signal to the tracking motor driver 509 to cause the tracking motor 512 to adjust a rear pulley in a direction that addresses the mis-tracking. The tracking motor driver 509 can be, for example, an AC, DC, or stepper motor driver (depending upon the configuration of the tracking motor 512). The tracking motor driver 509 can also take the form of a variable speed controller such as the Acrison, Inc. 060 or 040 DC motor controller or it may fix the speed of the tracking motor driver 509 at a constant speed. In some implementations, the tracking motor 512 is coupled to a driveshaft that is coupled to a take up bearing, on which a rear pulley is mounted. Rotation of the driveshaft causes the take up bearing to move in either a first or second direction, thereby adjusting the rear pulley. The adjustment can occur at a rate that varies with the belt speed detected by belt speed sensor 502. The configuration relating to these features can be stored in parameters store 504.

In cases where the controller 505 determines that a certain level of mis-tracking has been exceeded (e.g., stage 2 mis-tracking), it can cause an alarm 507 to be triggered. The alarm 507 can be local to the system, or can be remote. Alternatively, the alarm 507 can cause certain personnel to be alerted (e.g., via an e-mail, a pager call, a phone call, a text message, etc.). Also, the controller 505 can be programmed to stop the gearmotor 511 (which rotates the belt) when a certain level of mis-tracking is exceeded. The controller 505 interfaces with the gearmotor driver 510 which can be, for example, a DC, AC or stepper motor driver (depending on the configuration of gearmotor 511). The tracking motor driver 509 can also take the form of an "off-the-shelf" variable speed controller such as the Acrison, Inc. 060 or 040 DC motor controller. The configuration relating to these features can be stored in the parameters store 504.

Figure 6:
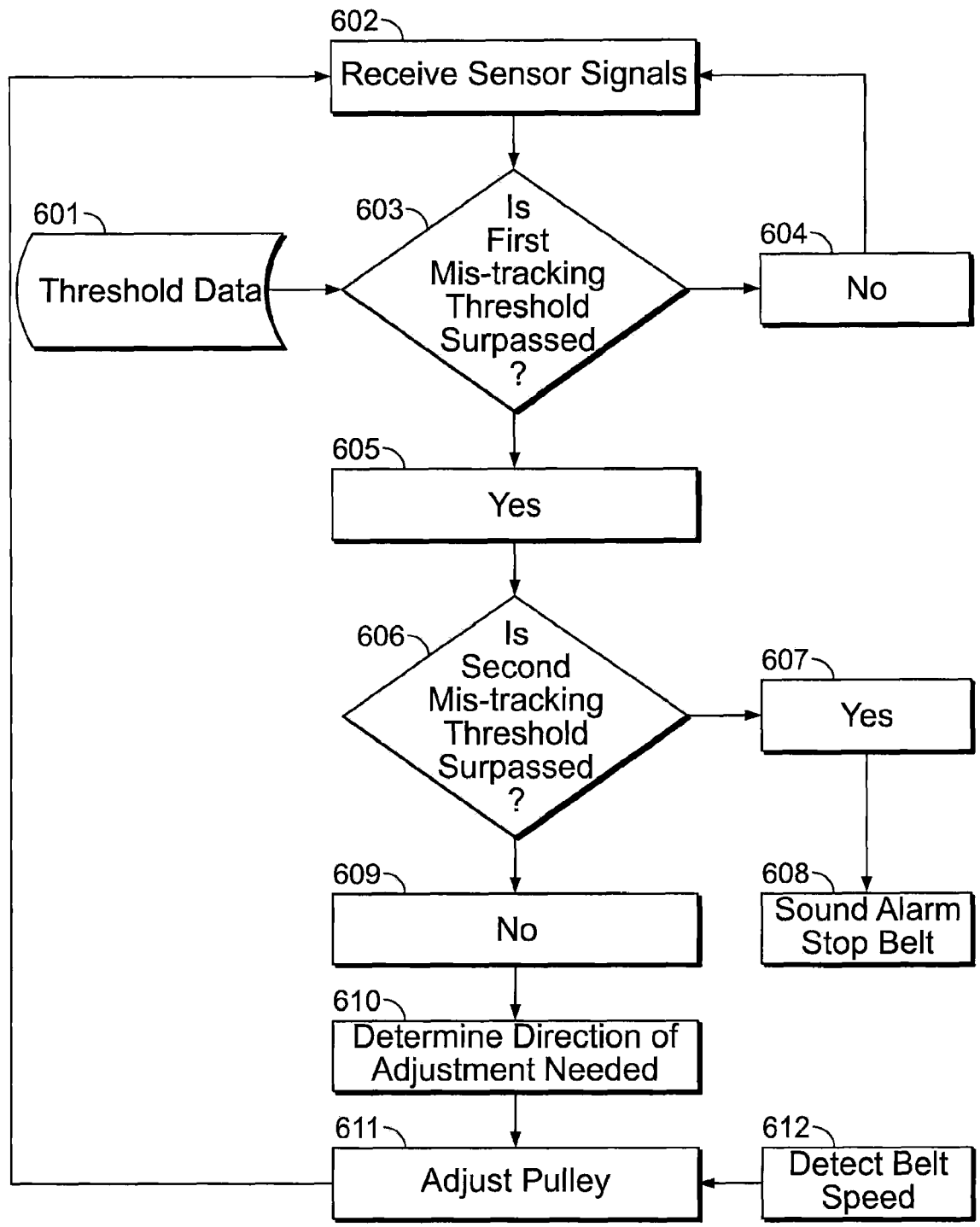
FIG. 6 is a flow chart illustrating an implementation of a method for automatic belt mis-tracking adjustment.

FIG. 6 is a flow chart illustrating an implementation of a method for automatic belt mis-tracking correction. The first step involves receiving sensor signals (602). The sensor signals can be from one or more sensors disposed proximate to the belt, in a position where mis-tracking can detected by the sensors. In some implementations, a beneficial position is to place them on the weighbridge or lever system of the weight sensor. This enables detection of mis-tracking in a sensitive area of the system, and is also an area in which measurements are taken. Next, based on the received signals, it is determined if a first mis-tracking threshold has been surpassed (603). The magnitude of that threshold can be obtained from the threshold data store 601, which informs steps 603 and 606.

If the first mis-tracking threshold has not been surpassed (604), it is presumed that the system is operating normally. This method continues, e.g., in a loop, to receive sensor signals (602) and test them (603).

If the first mis-tracking threshold has been surpassed (605), the next step is to determine whether a higher order mis-tracking threshold has been surpassed. Higher order mis-tracking thresholds correspond to greater amounts of mis-tracking. Certain amounts of mis-tracking can be addressed by automatic adjustment, whereas some greater amounts are not as amenable. For example, in a multi-stage system, stages 1, 2 and 3 can include belt adjustment (e.g., adjusting the rear pulley) while the belt is moving, whereas stage 4 can involve stopping the belt entirely (e.g., Stage 1—adjusting the belt; Stage 2—slowing the belt, then adjusting the belt, Stage 3—slowing the belt, then adjusting it aggressively; Stage 4—stopping the belt, sounding an alarm and shutting off the material feed). In other implementations, the stages are not discrete, but rather are a continuum from zero mis-tracking up to (and beyond) catastrophic mis-tracking. In this implementation of the method, first (603) and second (606) stages are illustrated.

If the second mis-tracking threshold is surpassed (607), the method sounds an alarm and stops the belt (608). In this implementation, the second mis-tracking threshold represents a level of mis-tracking that is not corrected automatically, but instead requires intervention from personnel.

If the second mis-tracking threshold is not surpassed (609), the method determines what type of adjustment is needed to address the mis-tracking (610). This step is, generally speaking, related to the type and arrangement of sensors used to detect mis-tracking. For example, if the system is utilizing one or more switches on either side of the belt, the method determines the direction of needed adjustment based on which sensor is triggered. For example, if a sensor on the right side of the belt is triggered, step 610 determines that the belt has moved too far to the right, and that it must adjust (611) to move the belt to the left. In some implementations, the adjustment (611) is accomplished by adjusting a take up bearing coupled to a rear pulley. In another implementation, the mis-tracking sensors may include a linear array of transmitters and receivers and circuitry and/or logic that detects when the signal from one transmitter does not reach its respective receiver. In such an implementation, step 610 would determine on which side of the belt are more receivers not receiving the transmitted signal. That side would represent the direction in which the belt is mis-tracking. The method would then adjust (611) accordingly.

The pulley adjustment 611 is informed by receiving a signal representative of the belt speed 612.

In one implementation of tracking adjustment, the speed at which the tracking motor operates (to adjust for a mis-tracking condition) is determined by the speed of the belt. In this implementation, the tracking motor is a variable speed motor, slaved to the speed of the gearmotor drive powering the belt (e.g., in a fixed ratio, factory set, based on established parameters that optimize tracking adjustment). In this implementation, the faster the belt is moving, the faster the speed of the tracking motor.

In another implementation, which may be implemented at lower cost, the speed of the tracking motor (to adjust for a mis-tracking condition) is fixed (e.g., a constant speed gearmotor drive). The variable which is based on the speed of the belt is the length of the time the tracking motor operates, and the "dwell" time between corrections (this can be analogized to the "duty cycle" of the motor). As the belt slows, the dwell time increases (i.e., the duty cycle is decreased) when adjusting for mis-tracking.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

A number of implementations of the invention have been described. Nevertheless, it will be understood that various modifications may be made without departing from the spirit and scope of the invention. For example, the automatic belt tracking system can be employed with weigh belt weighers, weigh belt feeders, or any other apparatus that conveys material utilizing a belt. Moreover, various sensors, controllers, and mechanisms can be employed in carrying out the system. Accordingly, other embodiments are within the scope of the following claims.

What is claimed is:

1. A belt mis-tracking adjustment apparatus comprising:
a first pulley having two ends and an axis of rotation, at least one of the ends is coupled to a slidable bearing that enables translation of the end in a direction substantially perpendicular to the axis of rotation of the first pulley;
a motor having a rotatable output shaft coupled to the slidable bearing, wherein the rotation of the output shaft in a first direction causes the slidable bearing to translate in a first direction and rotation of the output shaft in a second direction causes the slidable bearing to translate in a second direction;
a second pulley arranged at a distance from the first pulley;
a belt coupled to the pulleys, the belt having two edges parallel to its direction of travel;
a first contact sensor disposed adjacent to a first edge of the belt;
a controller coupled to the sensor and the motor, wherein in response to the first edge of the belt contacting the first contact sensor, the controller is adapted to cause the motor to rotate the output shaft; and
a speed sensor coupled to the first pulley for generating a first speed signal;
wherein the controller is adapted to adjust the rate of rotation of the rotatable shaft based on the first speed signal.

2. The apparatus of claim 1 comprising:
a second contact sensor disposed adjacent to a second edge of the belt;
wherein if the first edge of the belt contacts the first contact sensor, the controller is adapted to cause the motor to rotate the output shaft in the first direction, and if the second edge of the belt contacts the second contact sensor, the controller is adapted to cause the motor to rotate the output shaft in the second direction.

3. The apparatus of claim 1 comprising a second motor coupled to the first pulley for causing the first pulley to rotate about its axis of rotation.

4. A belt mis-tracking adjustment apparatus comprising:
a first pulley having two ends and an axis of rotation, at least one of the ends is coupled to a slidable bearing that enables translation of the end in a direction substantially perpendicular to the axis of rotation of the first pulley;
a motor having a rotatable output shaft coupled to the slidable bearing, wherein the rotation of the output shaft in a first direction causes the slidable bearing to translate in a first direction and rotation of the output shaft in a second direction causes the slidable bearing to translate in a second direction;
a second pulley arranged at a distance from the first pulley;
a belt coupled to the pulleys, the belt having two edges parallel to its direction of travel;
a first contact sensor disposed adjacent to a first edge of the belt;
a controller coupled to the sensor and the motor, wherein in response to the first edge of the belt contacting the first contact sensor, the controller is adapted to cause the motor to rotate the output shaft; and
a speed sensor coupled to the second pulley for generating a second speed signal;
wherein the controller is adapted to adjust the rate of rotation of the rotatable shaft based on the second speed signal.

5. A belt mis-tracking adjustment apparatus comprising:
a first pulley having two ends and an axis of rotation, at least one of the ends is coupled to a slidable bearing that enables translation of the end in a direction substantially perpendicular to the axis of rotation of the first pulley;
a motor having a rotatable output shaft coupled to the slidable bearing, wherein the rotation of the output shaft in a first direction causes the slidable bearing to translate in a first direction and rotation of the output shaft in a second direction causes the slidable bearing to translate in a second direction;
a second pulley arranged at a distance from the first pulley;
a belt coupled to the pulleys, the belt having two edges parallel to its direction of travel;
a first contact sensor disposed adjacent to a first edge of the belt;
a second contact sensor disposed adjacent to a second edge of the belt;
a controller coupled to the first contact sensor, the second contact sensor and the motor,
wherein in response to the first edge of the belt contacting the first contact sensor, the controller causes the motor to rotate the output shaft in the first direction, and in response to the second edge of the belt contacting the second contact sensor, the controller causes the motor to rotate the output shaft in the second direction;
the first contact sensor and the second contact sensor comprise respective contact members which are constructed to be depressed upon contact with a respective edge of the belt;
the first contact sensor and second contact sensor are each operable to generate a signal representative of the degree to which each respective contact member is depressed;
stage identification logic for assigning a stage to a mis-tracking state depending upon the signal representative of the degree to which each respective contact member is depressed based on predetermined stage parameters, the predetermined stage parameters including a first stage representative of a first degree of mis-tracking and a second stage representative of a second degree of mis-tracking, the second degree being larger than the first degree; and
stage correction logic adapted to cause the rotation of the rotatable shaft at a first rate in cases of the first stage and to cause the rotation of the rotatable shaft at a second rate in case of the second stage.

6. A belt conveyor system comprising:
a first pulley having two ends;
a second pulley spaced a distance from the first pulley;
a belt mounted on the first and second pulleys, the belt having two edges parallel to its direction of travel, the belt forming an endless loop around the first and second pulleys;
a drive motor coupled to the second pulley, wherein rotation of the drive motor causes rotation of the second pulley, and wherein rotation of the second pulley causes the belt to travel such that at least one substantially linear portion of the belt travels in a direction substantially perpendicular to the axis of rotation of the second pulley;
a slidable bearing coupled to at least of one of the ends of the first pulley which allows translation of the end in a direction substantially parallel to the travel of at least one linear portion of the belt;
a tracking motor having an output shaft coupled to the slidable bearing, wherein the rotation of the output shaft in a first direction will cause the slidable bearing to translate in a first direction and rotation of the output shaft in a second direction will cause the slidable bearing to translate in a second direction;

a contact sensor disposed adjacent to a first edge of the belt;

a controller coupled to the sensor and the tracking motor adapted to cause the motor to rotate the output shaft if the first edge of the belt contacts the first contact sensor; and a speed sensor coupled to the first pulley or the second pulley for generating a first speed signal, wherein the controller adjusts the rate of rotation of the output shaft based on the first speed signal.

7. The system of claim 6 comprising:

a second contact sensor disposed adjacent to a second edge of the belt;

wherein the controller is adapted to:
 cause the motor to rotate the output shaft in the first direction if the first edge of the belt contacts the first contact sensor, and
 cause the motor to rotate the output shaft in the second direction if the second edge of the belt contacts the second contact sensor.

8. The system of claim 7 wherein:

the first contact sensor and the second contact sensor comprise respective contact members which are adapted to be depressed upon contact with a respective edge of the belt; and the first contact sensor and second contact sensor are operable to generate a signal representative of the degree to which each respective contact member is depressed.

9. The system of claim 8 wherein the controller comprises:

stage identification logic for assigning a stage to a mistracking state depending upon the signal representative of the degree to which a contact member is depressed based on predetermined stage parameters, the predetermined stage parameters including a first stage representative of a first degree of mis-tracking and a second stage representative of a second degree of mis-tracking, the second degree larger than the first degree;

stage correction logic capable of causing the rotation of the output shaft at a first rate in cases of a first stage and capable of causing the rotation of the output shaft at a second rate in cases of a second stage.

10. The system of claim 9 wherein:

the predetermined stage parameters include a third stage representative of a third degree of mis-tracking, the third degree larger than the second degree; and the stage correction logic slows the rotation of the drive motor in cases of the third degree of mis-tracking.

11. The system of claim 6 comprising:

an input port for receiving material to be conveyed on the belt; and a weigh sensor disposed adjacent a linear portion of the belt for generating a signal representative of the weight of the material on the belt.

12. A method for automatically addressing belt mis-tracking in a belt conveyor having a belt mounted on first and second pulleys, comprising:

receiving a signal indicative of mis-tracking when an edge of the belt has contacted a contact sensor comprising first and second multi-stage switches;

detecting the speed of the belt; and automatically adjusting an end of second pulley upon detection of mistracking, the rate of adjustment being related to the speed of the belt;

receiving signals from the first and second multi-stage switches indicative of the degree to which the belt is mis-tracking in a first and second direction, respectively;

defining a first degree of mis-tracking;

defining a second degree of mis-tracking, the second degree being greater than the first degree;

in instances of the first degree of mis-tracking, adjusting an end of the second pulley at a first speed; and in instances of the second degree of mis-tracking, adjusting the end of the second pulley at a second speed, the second speed being greater than the first speed.

13. The method of claim 12 comprising:

automatically adjusting the end of the second pulley so that the belt moves in the second direction if the belt is mistracking in the first direction;

automatically adjusting the end of the second pulley so that the belt moves in the first direction if the belt is mistracking in the second direction.

14. The method of claim 12 comprising:

defining a third degree of mis-tracking, the third degree being greater than the second degree; and in instances of a third degree of mistracking, generating a notification signal.

15. The method of claim 14 wherein generating a notification signal comprises at least one of sounding an alarm, sending an email, and initiating telephonic communication.

* * * * *